(12) United States Patent
Igarashi et al.

(10) Patent No.: US 9,175,578 B2
(45) Date of Patent: Nov. 3, 2015

(54) TURBOCHARGER

(75) Inventors: Osamu Igarashi, Toyota (JP);
Kazutomo Yamada, Kariya (JP);
Kazunori Kawabata, Toyota (JP);
Takeyuki Kato, Kariya (JP); Norihiko Sumi, Miyoshi (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 661 days.

(21) Appl. No.: 13/522,621

(22) PCT Filed: Mar. 31, 2011

(86) PCT No.: PCT/JP2011/058285
§ 371 (c)(1),
(2), (4) Date: Jul. 17, 2012

(87) PCT Pub. No.: WO2012/131997
PCT Pub. Date: Oct. 4, 2012

(65) Prior Publication Data
US 2012/0328416 A1    Dec. 27, 2012

(51) Int. Cl.
*F04D 29/12*    (2006.01)
*F01D 17/10*    (2006.01)
*F01D 17/16*    (2006.01)
(Continued)

(52) U.S. Cl.
CPC ............ *F01D 17/105* (2013.01); *F01D 17/165* (2013.01); *F01D 17/20* (2013.01); *F02B 37/24* (2013.01); *F05D 2220/40* (2013.01); *F05D 2240/55* (2013.01); *F05D 2250/75* (2013.01);
(Continued)

(58) Field of Classification Search
CPC ...... F01D 17/20; F01D 17/105; F01D 17/165
USPC .......... 277/370, 385, 390, 404; 415/156, 158, 415/160, 166; 60/602
See application file for complete search history.

(56) References Cited

U.S. PATENT DOCUMENTS 5,799,953 A    9/1998  Henderson
7,080,510 B2 *  7/2006  Ishihara et al. ................. 60/602
(Continued)

FOREIGN PATENT DOCUMENTS

EP    1 644 625 A1    4/2006
JP    62-12735 U    1/1987
(Continued)

*Primary Examiner* — Nathaniel Wiehe
*Assistant Examiner* — Woody A Lee, Jr.
(74) *Attorney, Agent, or Firm* — Sughrue Mion, PLLC

(57) ABSTRACT

A turbocharger includes a drive shaft to transmit a driving force of an actuator to a mechanism in the turbo housing, and a bush to rotatably support the drive shaft, wherein a seal is provided at an end portion on the open-air side of the bush. The seal includes a seal body made of resin and a metallic spring fitted into a recessed portion of the seal body, wherein an internal lip portion of the seal body is pressed by the elastic force of the spring to the outer circumferential surface of the drive shaft. Further, an end surface that is contactable with a member (drive link) disposed on the open-air side of the drive shaft is formed in the seal body. The seal having the above-described structure is provided at the end portion on the open-air side of the bush so as to achieve excellent sealability, so that this securely prevents exhaust gas in the turbo housing from passing through between the outer circumferential surface of the drive shaft and the inner circumferential surface of the bush and flowing out to the outside.

6 Claims, 13 Drawing Sheets

(51) Int. Cl.
*F02B 37/24* (2006.01)
*F01D 17/20* (2006.01)

(52) U.S. Cl.
CPC ....... *F05D 2260/56* (2013.01); *F05D 2300/432* (2013.01); *Y02T 10/144* (2013.01)

(56) References Cited

U.S. PATENT DOCUMENTS

| | | | |
|---|---|---|---|
| 7,644,583 B2 * | 1/2010 | Leavesley | ........................ 60/602 |
| 8,579,579 B2 * | 11/2013 | Castan et al. | ................. 415/160 |
| 2005/0262841 A1 * | 12/2005 | Parker | ............................ 60/602 |
| 2006/0213195 A1 | 9/2006 | Leavesley | |

FOREIGN PATENT DOCUMENTS

| | | | |
|---|---|---|---|
| JP | 09303153 A | * 11/1997 | .............. F02B 37/18 |
| JP | 11-229886 A | 8/1999 | |
| JP | 2005-351089 A | 12/2005 | |
| JP | 2008-309111 A | 12/2008 | |
| JP | 2009-167855 A | 7/2009 | |
| JP | 2009-270537 A | 11/2009 | |
| JP | 2009-299505 A | 12/2009 | |
| JP | 2011-017326 A | 1/2011 | |
| WO | 2005/008041 A1 | 1/2005 | |

* cited by examiner

TURBOCHARGER

CROSS REFERENCE TO RELATED APPLICATIONS

This application is a National Stage of International Application No. PCT/JP2011/058285 filed Mar. 31, 2011, the contents of all of which are incorporated herein by reference in their entirety.

TECHNICAL FIELD

The present invention relates to a turbocharger mounted in an internal combustion engine.

BACKGROUND ART

An internal combustion engine (hereinafter referred to as an engine) mounted in a vehicle and the like is equipped with a turbocharger (supercharger) that utilizes exhaust energy. Generally, the turbocharger includes a turbine wheel that is rotated by exhaust gas flowing through an exhaust path of the engine, a compressor impeller to forcibly transfer air in an intake path to a combustion chamber of the engine, and a link shaft to link the turbine wheel with the compressor impeller. With respect to the turbocharger with the structure described above, the turbine wheel disposed in the exhaust path is rotated by the exhaust energy, which allows the compressor impeller disposed in the intake path to rotate in accordance with the rotation of the turbine wheel so as to provide supercharged intake air and forcibly transfer the supercharged air to the combustion chamber of each cylinder of the engine.

As for the turbocharger of this type, there has been known a variable nozzle vane type turbocharger in which supercharged pressure with respect to the exhaust energy is adjustable.

For example, the variable nozzle vane type turbocharger includes a variable nozzle vane mechanism that includes a plurality of nozzle vanes (also referred to as variable vanes) that are disposed in the exhaust gas flow path of a turbine housing and configured to change the flow path area of the exhaust gas flow path, an actuator to provide displacement (rotation) for the nozzle vanes, and the like. The turbocharger changes the opening degree of the nozzle vanes so as to change the flow path area (throat area) between the nozzle vanes adjoined to each other, whereby adjusting the velocity of the exhaust gas introduced to the turbine wheel (for example, see Patent Documents 1 to 3). Thus, the adjustment of the velocity of the exhaust gas is carried out, so that the rotational velocity of the turbine wheel and the compressor impeller can be adjusted, and the pressure of air introduced to the combustion chamber of the engine can be adjusted, which, for example, makes it possible to improve torque responsiveness associated with acceleration and the degree of freedom of conformity in terms of output, fuel consumption (fuel consumption rate), and emission. Also, with respect to the turbocharger, as a method of controlling supercharged pressure, for example, there has been a method in which an exhaust bypass path to bypass the turbine wheel is provided, and a wastegate valve to open and close the exhaust bypass path is provided, and the opening degree of the wastegate valve is adjusted, and the amount of the exhaust gas that bypasses the turbine wheel is adjusted, so as to control the supercharged pressure (see Patent Document 2).

RELATED ART DOCUMENTS

Patent Document

Patent Document 1: Japanese Unexamined Patent Application Publication No. 2011-017326.
Patent Document 2: Japanese Unexamined Patent Application Publication No. 2005-351089.
Patent Document 3: Japanese Unexamined Patent Application Publication No. 2009-299505.

SUMMARY OF THE INVENTION

Problems to be Solved by the Invention

The variable nozzle vane type turbocharger includes a drive shaft to transmit a driving force of an actuator disposed on the outside of a turbo housing to a link mechanism (variable nozzle vane mechanism) on the inside of the turbo housing, and a bush to rotatably support the drive shaft. There provided a clearance between the outer circumferential surface of the drive shaft and the inner circumferential surface of the bush in order to make the drive shaft rotatable. Also, the drive shaft and the bush are respectively disposed facing the inside (inside of the turbo housing) and the outside (atmosphere side) of the link chamber that accommodates the link mechanism. Accordingly, when pressure in the link chamber increases, there occurs a great difference between the pressure in the link chamber and the atmospheric pressure, and there is the case where the exhaust gas from the link chamber (the turbo housing) flows into the clearance between the outer circumferential surface of the drive shaft and the inner circumferential surface of the bush. Under the circumstances, there is an apprehension in that unburned HC (Hydrocarbons) included in the exhaust gas in the turbo housing passes through between the drive shaft and the bush and flows out to the outside.

Similarly, the wastegate valve device mounted on the turbocharger is configured such that the drive shaft transmits a driving force of the actuator disposed on the outside of the turbocharger to a drive mechanism (valve opening and closing mechanism) on the inside of the turbo housing. Accordingly, there is the same apprehension as that in the case of the variable nozzle vane mechanism described above.

Patent Documents 1 and 2 disclose a structure to seal the clearance between the bush and the drive shaft that penetrates the housing of the turbocharger. However, although the sealing structure disclosed by these patent publications can reduce leakage of the exhaust gas passing through between the drive shaft and the bush, there is room for improvement in terms of perfect prevention for the exhaust gas that flows out to the outside.

The present invention has been achieved in view of the above circumstances, and it is an object of the present invention to provide a turbocharger that includes a drive shaft to transmit a driving force of the actuator disposed on the outside of a turbo housing to a drive mechanism on the inside of the turbo housing, and a bush to rotatably support the drive shaft, whereby achieving a structure that securely prevents exhaust gas in the turbo housing from passing through between the drive shaft and the bush and flowing out to the outside.

Means of Solving the Problems

According to one aspect of the present invention, a turbocharger includes a compressor impeller configured to be provided in an intake path of an internal combustion engine, a turbine wheel configured to be provided in an exhaust path of the internal combustion engine, a drive shaft configured to penetrate a turbo housing to be provided and transmit a driving force of an actuator disposed at an outside of the turbo housing to a drive mechanism in the turbo housing, a bush configured to rotatably support the drive shaft on the turbo housing; and a seal configured to be provided at an end portion on an external side of the turbo housing of the bush (end portion of open-air side). The seal includes a circular seal body that is made of resin and a metallic spring. The seal body includes an inner circumferential surface that abuts on an outer circumferential surface of the drive shaft, and an end surface that is contactable with a member provided the external side of turbo housing of the drive shaft. The spring presses the seal body to an inner circumferential side and an outer circumferential side in the radial direction. More specifically, the seal is fitted into a circular recessed portion disposed at the end portion on the external side (open-air side) of the housing of the bush, and the inner circumferential surface of the seal body is pressed by an elastic force of the spring to the outer circumferential surface of the drive shaft, and the outer circumferential surface of the seal body is pressed by the elastic force of the spring to the inner circumferential surface of the recessed portion of the bush.

With the aspect of the present invention, the seal is provided at the end portion of the open-air side of the bush to rotatably support the drive shaft, so that when the turbine housing is heated to a high temperature, the seal body made of resin is little affected by the heat. Accordingly, this prevents the loss of elasticity of the seal body. Also, the seal body is pressed by the elastic force of the spring to the outer circumferential surface of the drive shaft and the inner circumferential surface of the bush, so that sealing force (straining force) is strengthened. Moreover, when pressure (exhaust gas pressure) in the turbo housing increases, the seal body is pressed by the pressure to the external side thereof, and the end surface of the seal body is abutted on a member (drive link and the like) of the end portion of the drive shaft while being pressed against the member. Accordingly, the sealing function is provided by this portion. Consequently, the single seal can achieve a double sealing structure, whereby securing a high level of sealability.

Thus, with the aspect of the present invention, the seal having excellent sealability is provided at the end portion of the open-air side of the bush to rotatably support the drive shaft, so that this securely prevents the exhaust gas in the turbo housing from passing through between the outer circumferential surface of the drive shaft and the inner circumferential surface of the bush and flowing out to the outside.

In the present invention, it is preferable that the material of the seal body be made up of a fluorocarbon polymer that has a high heat-resistant property and a low friction coefficient, and in particular, it is preferable that PTFE (polytetrafluoroethylene) be applied.

In the aspect of the present invention, as a specific configuration, the seal body includes a circular recessed portion, and an inner lip portion and an outer lip portion are formed respectively on the inner circumferential side and the outer circumferential side of the recessed portion and the spring is fitted into the circular recessed portion of the seal body. Then, it is configured such that the inner lip portion of the seal body is pressed by an elastic force of the spring to the outer circumferential surface of the drive shaft, and the outer lip portion of the seal body is pressed by the elastic force to the inner circumferential surface of the bush. In this case, it is preferable that the seal be disposed such that an opening of the recessed portion of the seal body faces an internal side of the turbo housing, and a cross-sectional shape of the spring (cross-sectional shape along a plane passing through the center of the drive shaft) be formed in a bent shape that is opened to the internal side of the turbo housing (for example, in a V shape or a U shape).

With such configuration applied, when pressure in the turbo housing increases, the spring having a bent shape (for example, cross-sectional V-formed shape) is transformed in an opening direction. That is, the spring is transformed in the direction that the inner lip portion (inner circumferential surface) of the seal body is pressed against the outer circumferential surface of the drive shaft and in the direction that the outer lip portion (outer circumferential surface) of the seal body is pressed against the inner circumferential surface of the bush. Moreover, the pressing force increases in proportion to the pressure in the turbo housing. Accordingly, even when the pressure in the turbo housing increases, a high level of sealability that is strong enough to withhold the pressure is ensured. Consequently, this more securely prevents the exhaust gas in the turbo housing from flowing out to the outside.

According to another aspect of the present invention, a turbocharger is exemplified by a variable nozzle vane type turbocharger that includes a variable nozzle vane mechanism configured to include a plurality of nozzle vanes provided on an outer circumferential side of the turbine wheel and configured to adjust a flow of exhaust gas by changing an opening degree of the plurality of nozzle vanes, a drive shaft configured to link a drive arm of the variable nozzle vane mechanism on the inside of the turbo housing with a drive link on the outside of the turbo housing, and a bush configured to rotatably support the drive shaft. According to this turbocharger, the seal having the above-described structure is provided at the end portion (end portion on the open-air side) of the external side of the turbo housing of the bush, so that this securely prevents the exhaust gas in the turbo housing from passing through between the outer circumferential surface of the drive shaft and the inner circumferential surface of the bush and flowing out to the outside.

Effects of the Invention

According to the aspect of the present invention, a turbocharger includes a drive shaft to penetrate a turbo housing and a bush to rotatably support the drive shaft, and a seal having excellent sealability is provided at an end portion on an external side of the turbo housing of the bush, which securely prevents the exhaust gas in the turbo housing from passing through between the drive shaft and the bush and flowing out to the outside.

MODES FOR CARRYING OUT THE INVENTION

Figure 1:
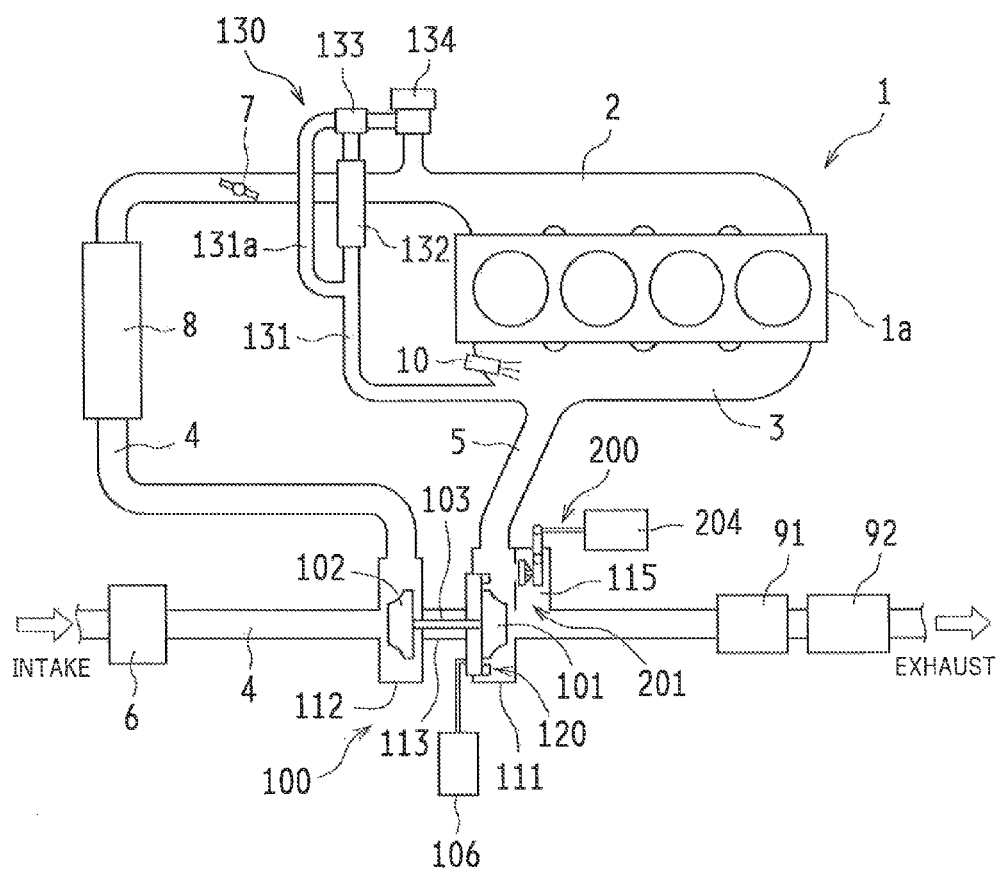
FIG. 1 is a schematic configuration diagram of a diesel engine to which a turbocharger of the present invention is applied as one example.

Hereinafter, embodiments of the present invention will be described below referring to the drawings.

—Engine—

First, an engine (internal combustion engine) in which a turbocharger according to the present invention is applied will be described.

FIG. 1 is a diagram illustrating a schematic configuration of an engine 1 mounted in a vehicle as one example.

For example, the engine 1 of this example is a common rail in-cylinder direct injection four-cylinder diesel engine in which a cylinder head is connected to an intake manifold 2 to distribute intake air to each cylinder and an exhaust manifold 3 to collect exhaust gas discharged from each cylinder.

An intake path 4 to take in air in the atmosphere and guide the air to the intake manifold 2 is connected to an inlet of the intake manifold 2. In the intake path 4, there are disposed an air cleaner 6, a compressor impeller 102 of a turbocharger 100 described later, an intercooler 8 that forcibly cools the intake air heated by supercharging with the turbocharger 100, a throttle valve 7, and the like.

Further, in an exhaust path 5, there are disposed NOx storage catalyst (NSR catalyst: NOx Storage Reduction Catalyst) 91 and a DPNR catalyst (Diesel Particulate-NOx Reduction Catalyst) 92.

Also, in the exhaust system, there is disposed a fuel addition valve 10 to add fuel into the inside of the exhaust manifold 3 (exhaust path on the upstream side of the exhaust gas flow with respect to a turbine housing 111). Fuel addition is carried out from the fuel addition valve 10 to the exhaust manifold 3, which increases the catalyst bed temperature, and NOx stored in the NOx catalyst is released, reduced and purified so as to restore the NOx storage capacity of the NOx catalyst.

It is noted that fuel may be supplied to the exhaust path on the upstream side of the catalyst by post-injection from a fuel injection valve (injector) of the engine 1, instead of the fuel addition of the fuel addition valve 10.

—Turbocharger—

The engine 1 is equipped with a turbocharger (supercharger) 100 that utilizes exhaust pressure so as to supercharge intake air.

Figure 2:
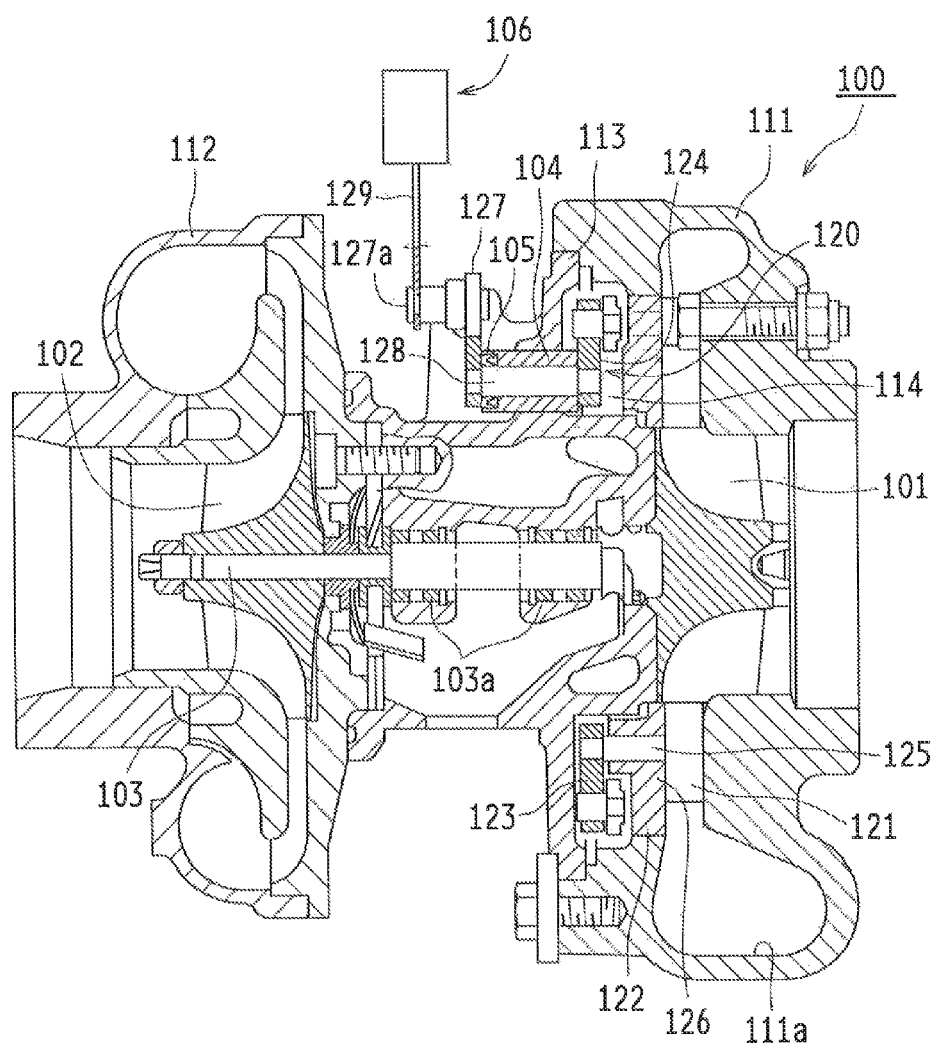
FIG. 2 is a longitudinal cross-sectional view of the turbocharger of the present invention illustrated as one example.

As shown in FIGS. 1 and 2, the turbocharger 100 is made up of a turbine wheel 101 disposed in the exhaust path 5, a compressor impeller 102 disposed in the intake path 4, a link shaft 103 to rotatably link the turbine wheel 101 with the compressor impeller 102, and the like. The turbine wheel 101 disposed in the exhaust path 5 is rotated by exhaust energy, whereby rotating the compressor impeller 102 disposed in the intake path 4. Intake air is supercharged by the rotation of the compressor impeller 102, and the supercharged air is forcibly transferred to a combustion chamber of each cylinder of the engine 1.

The turbine wheel 101 is accommodated in the turbine housing 111, and the compressor impeller 102 is accommodated in the compressor housing 112. Also, floating bearings 103*a* to support the link shaft 103 are accommodated in a center housing (bearing housing) 113. The turbine housing 111 and the compressor housing 112 are attached to both sides of the center housing 113.

The turbocharger 100 of this example is a variable nozzle-type turbocharger (VNT) in which a variable nozzle vane mechanism 120 is provided on the side of the turbine wheel 101. Adjusting the opening degree of the variable nozzle vane mechanism 120 ensures adjustment of the turbocharging pressure of the engine 1. The variable nozzle vane mechanism 120 will be described in detail later.

Figure 11:
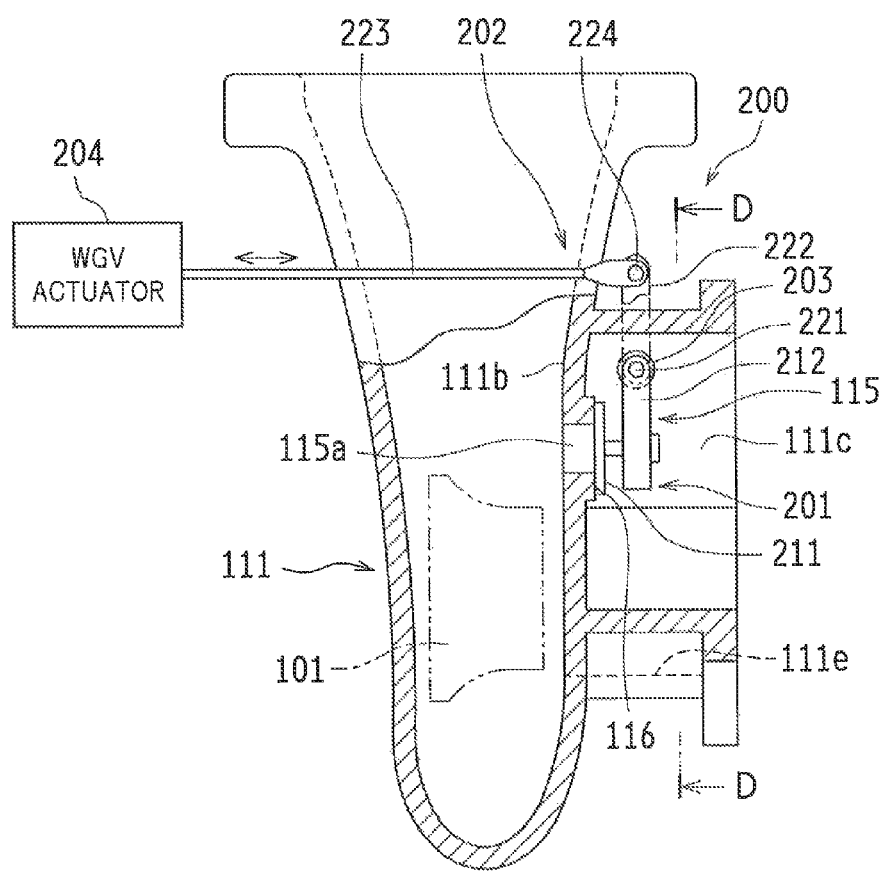
FIG. 11 is a diagram illustrating configuration of a wastegate valve device. It is noted that FIG. 11 shows a state where a valve is fully closed.
Figure 12:
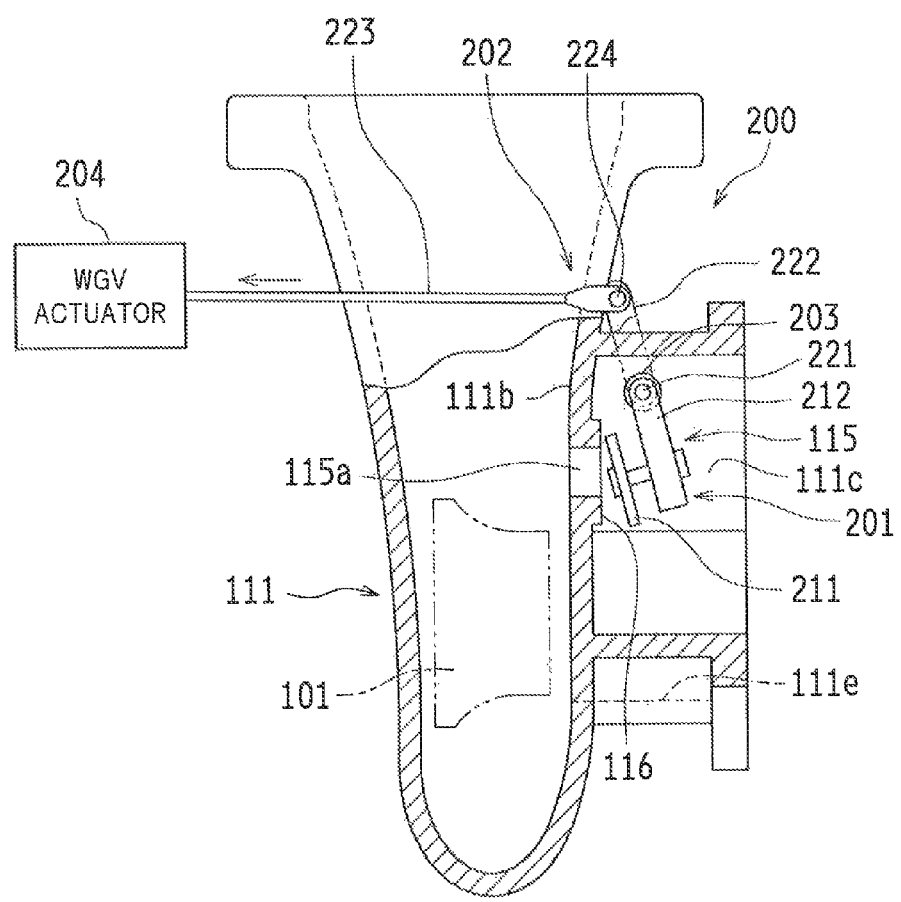
FIG. 12 is a diagram illustrating the configuration of the wastegate valve device. It is noted that FIG. 12 shows a state where the valve is fully opened.
Figure 13:
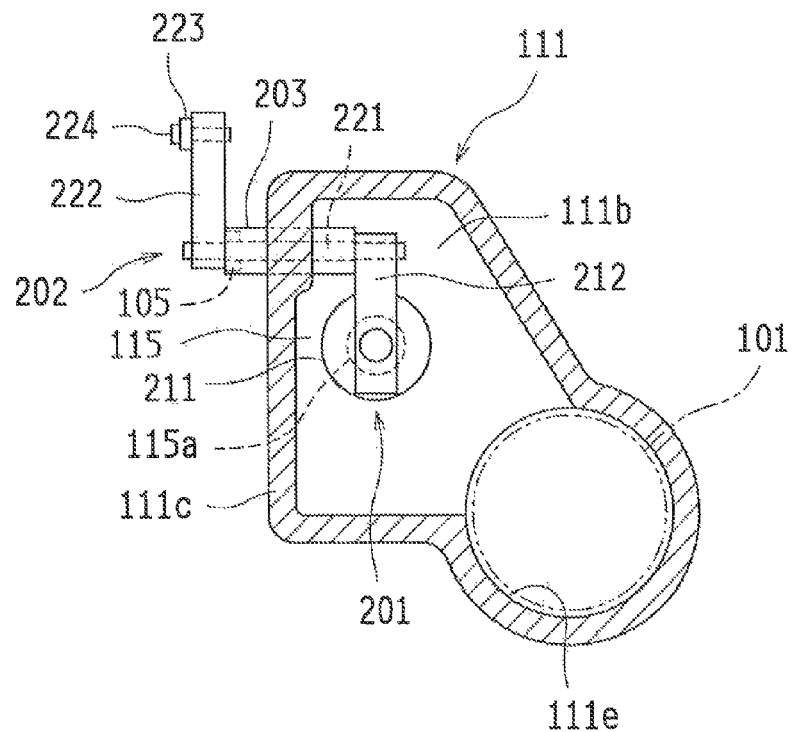
FIG. 13 is a cross-sectional view along a line D-D of FIG. 11. It is noted that part of a turbine housing is omitted in FIG. 13.
Figure 14:
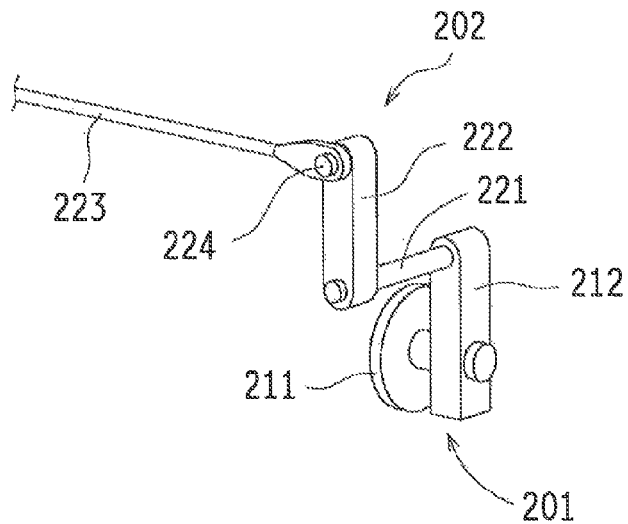
FIG. 14 is a perspective view illustrating configuration of part of a link mechanism and the wastegate valve.

In the turbocharger 100 of this example as shown in FIGS. 11 to 13, an exhaust bypass path 115 is formed in the turbine housing 111, and a wastegate valve 201 to open and close the exhaust bypass path 115 is disposed. A wastegate valve device 200 that includes the wastegate valve 201, a WGV actuator 204, and the like will be described in detail later.

—EGR Apparatus—

The engine 1 is equipped with an EGR apparatus 130. The EGR apparatus 130 is an apparatus to introduce part of exhaust gas to intake air so as to decrease the combustion temperature in the combustion chamber and reduce the amount of produced NOx.

As shown in FIG. 1, the EGR apparatus 130 includes an EGR path (exhaust gas recirculation path) 131. The one end portion of the EGR path 131 is connected to the intake path 4 between the intake manifold 2 and the throttle valve 7. The other end portion of the EGR path 131 is connected to the exhaust manifold 3. Part of the exhaust gas (EGR gas) is introduced to the intake path 4 through the EGR path 131. Introducing the EGR gas (gas with a higher specific heat and a lower oxygen amount, compared with the air) can decrease the combustion temperature in the cylinders so as to reduce the amount of produced NOx.

An EGR valve 134 to open and close the EGR path 131 is disposed in the middle of the EGR path 131. An EGR cooler 132 to cool exhaust gas passing through the EGR path 131 is disposed on the upstream side (exhaust side) of the EGR valve 134 in the EGR path 131. The density of the EGR gas is increased by the cooling of the EGR cooler 132, whereby improving an EGR ratio while securing intake air amount.

Also, the EGR apparatus 130 includes an EGR bypass path 131*a* to bypass the EGR cooler 132 and flow the EGR gas. A switching control valve 133 to adjust the opening degree of the EGR path 131 and the opening degree of the EGR bypass path 131*a* is provided at a connection portion between the EGR path 131 and the EGR bypass path 131a (connection portion on the downstream side of the EGR gas flow).

—Variable Nozzle Vane Mechanism—

Next, the variable nozzle vane mechanism 120 of the turbocharger 100 will be described referring to FIGS. 1 to 7.

The variable nozzle vane mechanism 120 of this example is disposed in a link chamber 114 formed between the turbine housing 111 and the center housing 113 of the turbocharger 100.

The variable nozzle vane mechanism 120 includes a plurality of nozzle vanes 121 (for example, 12 pieces), a circular unison ring 122, a plurality of opening and closing arms 123 that are disposed on the inner circumference side of the unison ring 122 with which part of the opening and closing arms are engaged, a drive arm 124 to drive each opening and closing arm 123, vane shafts 125 that are respectively connected to the opening and closing arms 123 so as to drive each nozzle vane 121, and a nozzle plate 126 to hold each vane shaft 125.

The plurality of nozzle vanes 121 are disposed on the outer circumferential side of the turbine wheel 101 at regular intervals. Each nozzle vane 121 is disposed above the nozzle plate 126 and rotates about the vane shaft 125 at a predetermined angle.

The drive arm 124 rotates about a drive shaft 128. The drive shaft 128 is integrally attached to the one end portion of a drive link 127. When the drive link 127 rotates, the drive shaft 128 rotates in accordance with the rotation of the drive link 127 so as to rotate (rock) the drive arm 124. It is noted that the drive shafts 128 penetrate through a wall body of the center housing 113 and are disposed respectively facing the inside and outside (atmosphere side) of the link chamber 114. Also, the drive shafts 128 are rotatably supported in the center housing 113 via a bush 104. The supporting structure of the drive shafts 128 will be described later.

An end portion of the outer circumferential side of the each opening and closing arm 123 is fitted into the inner circumferential surface of the unison ring 122. When the unison ring 122 rotates, the rotational force is transmitted to each opening and closing arm 123. Specifically, the unison ring 122 is slidably disposed in the circumferential direction with respect to the nozzle plate 126. The end portions of the outer circumferential side of each opening and closing arm 123 and the drive arm 124 are fitted into a plurality of recessed portions 122a disposed in the inner circumferential end of the unison ring 122. The rotational force of the unison ring 122 is transmitted to each opening and closing arm 123.

Each opening and closing arm 123 rotates about the vane shaft 125. Each vane shaft 125 is rotatably supported by the nozzle plate 126. The opening and closing arm 123 and the nozzle vane 121 are integrally linked by means of the vane shaft 125.

The nozzle plate 126 is fixed on the turbine housing 111. Pins 126a are inserted into the nozzle plate 126 (see FIGS. 3 and 5), and each pin 126a is fitted with a roller 126b. The rollers 126b guide the inner circumferential surface of the unison ring 122. Accordingly, the unison ring 122 is supported by the rollers 126b, whereby rotating in a predetermined direction.

In the above-described configuration, when the drive link 127 rotates, the rotational force of the drive link 127 is transmitted to the unison ring 122 via the drive shafts 128 and the drive arm 124. Each opening and closing arm 123 is rotated (rocked) in accordance with the rotation of the unison ring 122 so as to rotate each variable nozzle vane 121.

Further, in the variable nozzle vane mechanism 120 of this example, a link rod 129 is rotatably linked with the other end portion of the drive link 127 via a linkage pin 127a. The link rod 129 is linked with a VN actuator 106, and the VN actuator 106 allows the link rod 129 to transfer (advance forward and backward) so as to rotate the drive link 127, whereby rotating (displacing) each nozzle vane 121 in accordance with the rotation of the drive link 127.

Figure 3:
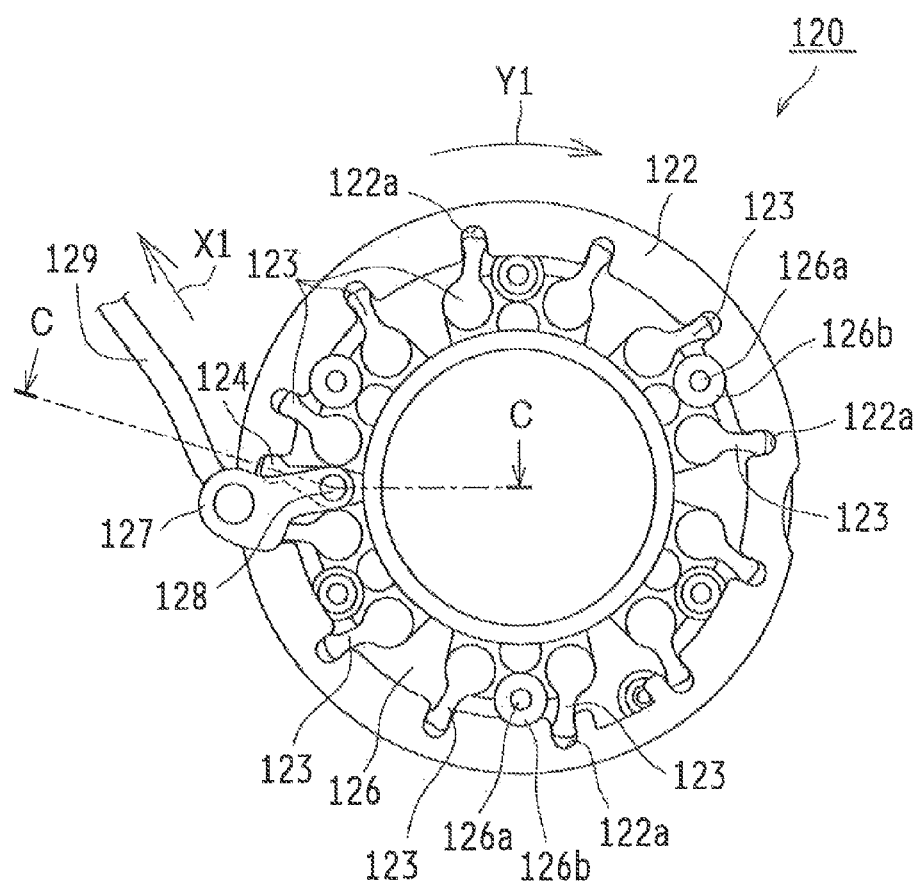
FIG. 3 is a diagram of a variable nozzle vane mechanism seen from an outer side of the turbocharger. It is noted that FIG. 3 shows a state where a nozzle vane is disposed on an opening side.
Figure 4:
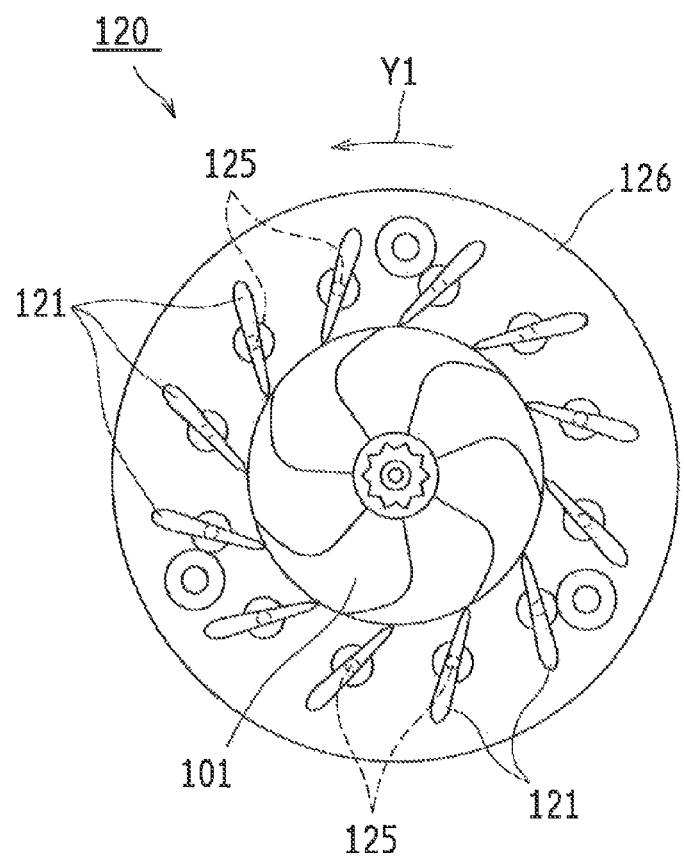
FIG. 4 is a diagram of the variable nozzle vane mechanism seen from an inner side of the turbocharger. It is noted that FIG. 4 shows a state where the nozzle vane is disposed on the opening side.

Specifically, as shown in FIG. 3, when the link rod 129 is pulled in the direction of an arrow X1 in the diagram (link rod 129 advances backward), the unison ring 122 rotates in the direction of an arrow Y1 in the diagram. As shown in FIG. 4, each nozzle vane 121 rotates about the vane shaft 125 in the counterclockwise direction in the diagram (Y1 direction), so that an opening degree of the nozzle vane (VN opening degree) is set higher.

Figure 5:
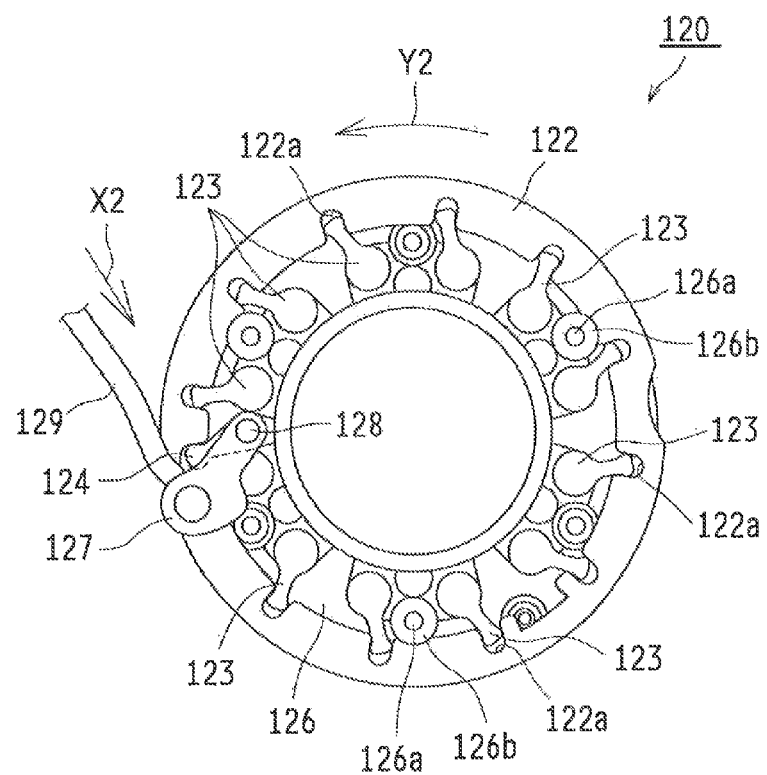
FIG. 5 is a diagram of the variable nozzle vane mechanism seen from the outer side of the turbocharger. It is noted that FIG. 5 shows a state where the nozzle vane is disposed on a closing side.
Figure 6:
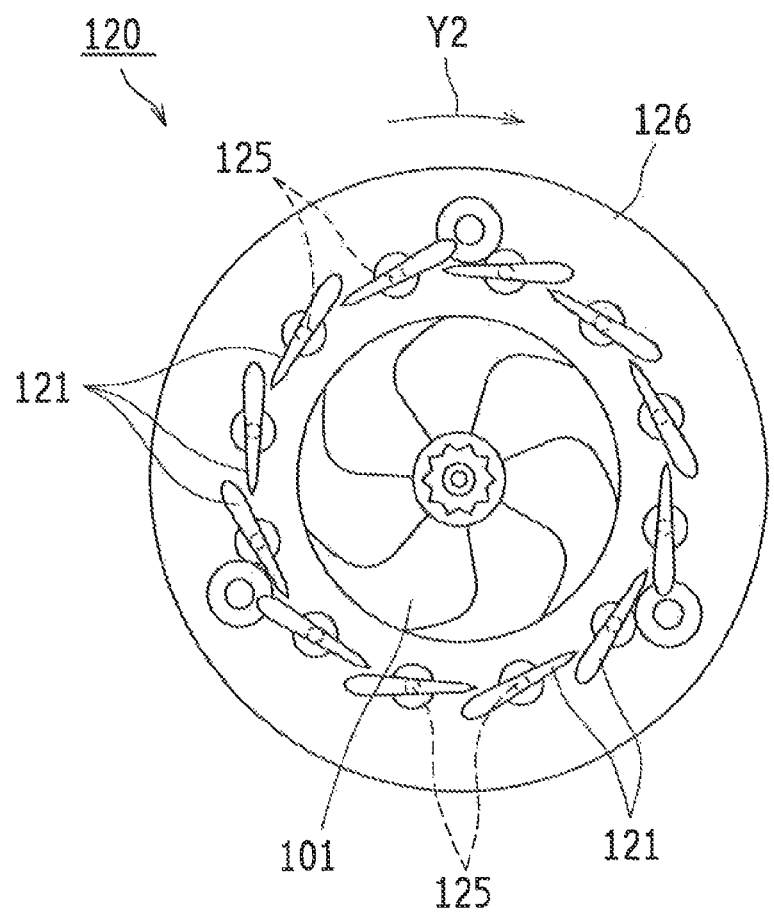
FIG. 6 is a diagram of the variable nozzle vane mechanism seen from the inner side of the turbocharger. It is noted that FIG. 6 shows a state where the nozzle vane is disposed on the closing side.

In contrast, as shown in FIG. 5, when the link rod 129 is pushed in the direction of an arrow X2 in the diagram (link rod 129 advances forward), the unison ring 122 rotates in the direction of an arrow Y2 in the diagram. As shown in FIG. 6, each nozzle vane 121 rotates about the vane shaft 125 in the clockwise direction in the diagram (Y2 direction), so that the opening degree of the nozzle vane (VN opening degree) is set lower.

It is noted that the VN actuator 106, for example, is exemplified as one that includes an electric motor (DC motor) and a conversion mechanism that converts the rotation of the electric motor into linear motion and transmits the linear motion to the link rod 129 (for example, gear mechanism that includes a worm gear and a worm wheel engaged with the worm gear). Also, the VN actuator may be applied as a negative pressure actuator that operates on negative pressure supplied from a negative pressure supply as a power source, or a positive pressure actuator.

With respect to the turbocharger 100 in the above-described configuration, a turbine housing vortex chamber 111a is provided in the turbine housing 111 that accommodates the turbine wheel 101. The exhaust gas is supplied to the turbine housing vortex chamber 111a, and the flow of the exhaust gas allows the turbine wheel 101 to rotate. In this case, as described above, the rotational position of each nozzle vane 121 is adjusted so as to set the rotational angle of the nozzle vane 121, whereby adjusting an amount and velocity of exhaust gas flowing through the turbine housing vortex chamber 111a to the turbine wheel 101. Accordingly, the performance of supercharging is adjusted. For example, when the engine 1 rotates at a low rate, the rotational position (displacement) of each of nozzle vanes 121 is adjusted in a manner as to decrease the flow path area (throat area) between the nozzle vanes 121 so as to increase the velocity of the exhaust gas, which makes it possible to obtain high supercharged pressure from the low speed area of the engine.

—Supporting Structure of Drive Shaft—

Figure 7:
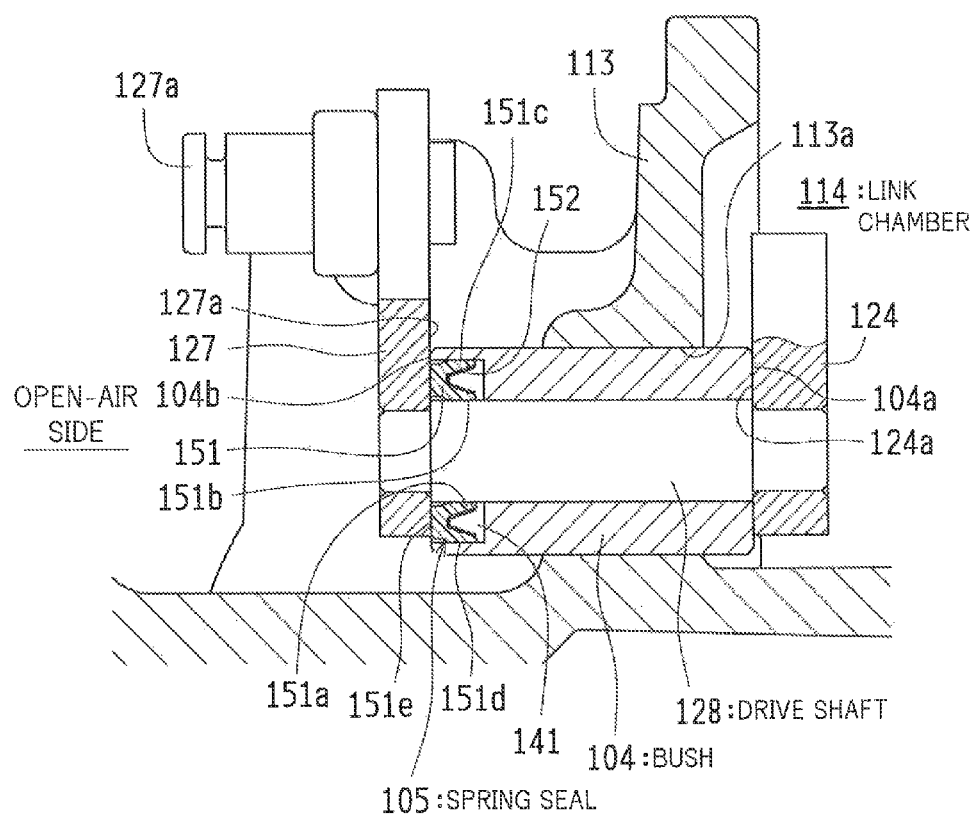
FIG. 7 is a cross-sectional view along a line C-C of FIG. 3.

Next, the supporting structure of the drive shaft 128 of the variable nozzle vane mechanism 120 will be described referring to FIG. 7. FIG. 7 is a cross-sectional view along the line C-C of FIG. 3.

In the structure shown in FIG. 7, a bush supporting hole 113a is provided in the wall body of the center housing 113 forming the link chamber 114, and a cylindrical bush 104 is pressed into the bush supporting hole 113a. The drive shaft 128 is rotatably supported by the bush 104. The drive shaft 128 and the bush 104 penetrate through the wall body of the center housing 113 and are disposed respectively facing the inside and outside (atmosphere side) of the link chamber 114.

Then, the drive link 127 is integrally attached to an end portion on the open-air side of the drive shaft 128 (the external side of the link chamber 114). Also, the drive arm 124 is integrally attached to the end portion on the side of the link chamber 114 of the drive shaft 128 (turbo housing side).

Thus, the drive link 127 in the outside of the link chamber 114 (outside of the center housing 113) and the drive arm 124 in the link chamber 114 are linked with each other via the drive shaft 128. When the drive link 127 is rotated by the driving force of the VN actuator 106, the rotational force of the drive link 127 is transmitted via the drive shaft 128 to the drive arm 124 so as to rotate the drive arm 124. Each of nozzle vanes 121 described above rotates (displaces) in accordance with the rotation of the drive arm 124.

In the above-described supporting structure, a clearance between the outer circumferential surface of the drive shaft 128 and the inner circumferential surface of the bush 104 is provided in order to make the drive shaft 128 rotatable. A distance between the side surface 124a of the drive arm 124 (surface on the side of the bush 104) and the side surface 127a of the drive link 127 (surface on the side of the bush 104) is set longer than a length of the axial direction of the bush 104 (distance between both end surfaces 104a and 104b of the bush 104) only by a predetermined length. There exists a clearance between the side surface 124a of the drive arm 124 and the side surface 104a of the bush 104 (the end surface of the internal side of the link chamber 114) or/and between the side surface 127a of the drive link 127 and the end surface 104b of the bush 104 (the end surface of the open-air side).

Incidentally, exhaust gas from the turbine housing 111 flows into the link chamber 114 that accommodates the variable nozzle vane mechanism (link mechanism) 120. The exhaust gas includes unburned fuel (unburned HC). In particular, when fuel addition on the upstream side with respect to the turbine housing 111 from fuel addition valve 10 or post-injection is executed, the amount of unburned HC included in the exhaust gas increases.

Also, in the supporting structure shown in FIG. 7, as described above, the clearance between the drive shaft 128 and the bush 104 is provided to make the drive shaft 128 rotatable. Accordingly, when pressure in the turbine housing 111, that is, pressure in the link chamber 114 increases, and there occurs a great difference between the pressure in the link chamber 114 and the atmospheric pressure, there is the case where the exhaust gas from the link chamber 114 flows into the clearance between the drive shaft 128 and the bush 104 (between the outer circumferential surface of the drive shaft 128 and the inner circumferential surface of the bush 104). Under the circumstances, there is an apprehension in that the unburned HC included in the exhaust gas in the turbine housing 111 passes through between the drive shaft 128 and the bush 104 and flows out to the outside.

Generally, an iron member is applied to the center housing 113 of the turbocharger 100. In cold districts, snow melting agents and the like are scattered on the roads in the winter season, and the snow melting agents and the like are attached to the center housing 113, which causes rust. In unpaved road districts or tropical rain-forest areas, rust is caused by mud, raindrops and the like in the center housing 113. When the rust formed in the center housing 113 progresses and is stripped off, there is the case where the stripped rust gets into a clearance between the drive shaft 128 and the bush 104 or between the end surface of the bush 104 (end surface of the internal side of the link chamber 114) and the drive arm 124 due to exhaust pulsation, which deteriorates the operation of the variable nozzle vane mechanism 120 and the like.

In order to solve this problem, in this example as shown in FIG. 7, a spring seal 105 is provided at the end portion of the open-air side of the bush 104 (end portion of the external side of the center housing 113). The spring seal 105 is fitted into a circular recessed portion 141 disposed at the end portion of the external side of the bush 104.

Figure 8:
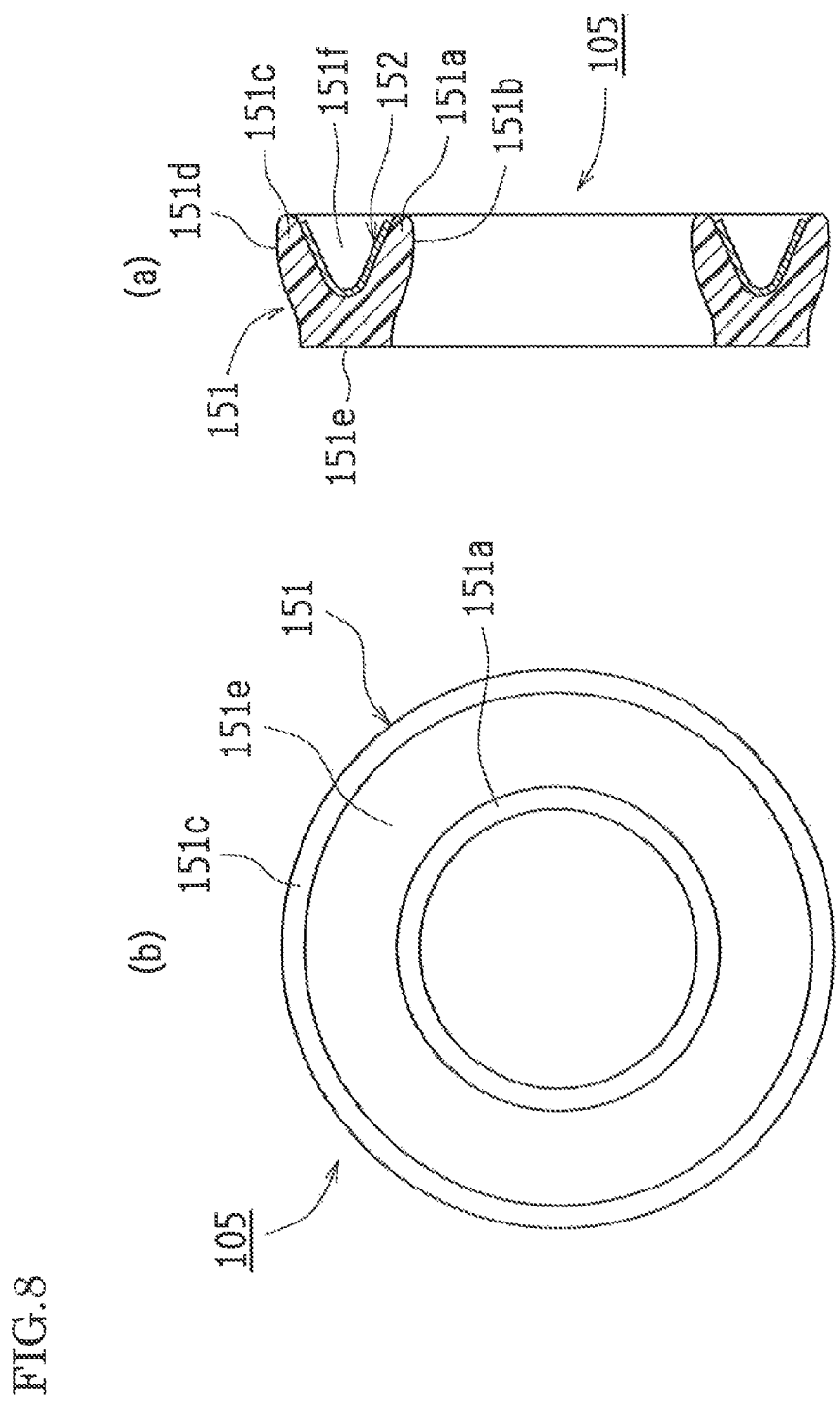
FIG. 8 (*a*) is a longitudinal cross-sectional view of a spring seal, and FIG. 8 (*b*) is a front view of the spring seal, illustrated as one example.
Figure 9:
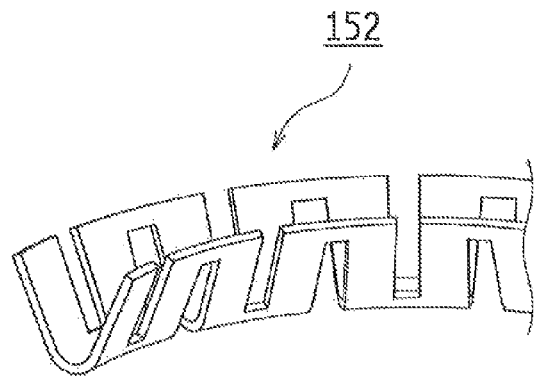
FIG. 9 is a perspective view of part of the spring constituting the spring seal of FIG. 8.

As shown in FIGS. 8 and 9, the spring seal 105 has a structure in which a circular seal body 151 and a spring 152 are combined.

The seal body 151 is a molded object or a manufactured object made of a fluorocarbon polymer (for example, PTFE). A circular recessed portion 151f is provided for the seal body 151. A circular inner lip portion 151a and a circular outer lip portion 151c are provided respectively on the inner circumferential side and the outer circumferential side of the recessed portion 151f.

Also, an inner circumferential surface 151b (inner circumferential surface of the inner lip portion 151a) that comes in contact with the outer circumferential surface of the drive shaft 128 is provided for the seal body 151. Also, an outer circumferential surface 151d (outer circumferential surface of the outer lip portion 151c) abutted on the inner circumferential surface of the bush 104 is provided for the seal body 151. Further, in the seal body 151, there is provided an end surface 151e is that capable of bringing into contact with the drive link 127 that is disposed at the end portion of the external side of the drive shaft 128.

The spring 152 is a component that is molded by bending a metal plate having corrosive property and the like. The cross-sectional shape along a plane passing through the center of the drive shaft 128 (the axis of the seal body 151) is molded in a V-formed shape. The spring 152 is fitted into the recessed portion 151f of the seal body 151 in such a manner that the opening side of the spring 152 (V-formed opening side) is positioned facing the side of the link chamber 114 (opposite side of the end surface 151e). Then, the spring seal 105 of the above-described structure is fitted into the recessed portion 141 of the end portion of the bush 104 while the opening of the recessed portion 151f of the seal body 151 faces the side of the link chamber 114 (internal side of turbo housing), and the bent-shaped spring 152 is compressed (with a bending angle decreased). Thus, the spring seal 105 is provided at the end portion of the bush 104 (end portion on the open-air side), so that sealability described below is achieved.

(1) The spring seal 105 is provided at the end portion on the open-air side of the bush 104. Accordingly, even when the turbine housing 111 or the center housing 113 is heated to a high temperature, the heat influenced on the seal body 151 made of resin is minimized. Consequently, the temperature of the seal body is set below the heat-resistant temperature, which can prevent the loss of elasticity of the seal body 151.

(2) The spring 152 is fitted into the recessed portion 151f of the seal body 151 while being compressed by the outer circumferential surface of the drive shaft 128 and the inner circumferential surface of the bush 104. The inner lip portion 151a of the seal body 151 is pressed by the elastic force of the spring 152 to the outer circumferential surface of the drive shaft 128, and the outer lip portion 151c of the seal body 151 is pressed by the elastic force of the spring 152 to the inner circumferential surface of the bush 104 (inner circumferential surface of the recessed portion 141), so that the sealing force (straining force) can be strengthened. Moreover, when the sealing force of the seal body 151 made of resin decreases, the sealing force can be secured by the elastic force of the spring 152, which can maintain a high level of sealability.

(3) When pressure (exhaust gas pressure) in the link chamber 114 (in the turbine housing 111) increases, the spring seal 105 is pressed against the drive link 127, and the end surface 151e of the seal body 151 is abutted on the drive link 127 while being pressed against the drive link 127. Accordingly, in addition to the sealing function exercised by the inner circumferential surface 151b of the seal body 151 that is abutted on the drive shaft 128, the sealing function can be exercised by the end surface 151e of the seal body 151 that is abutted on the drive link 127. Consequently, the single spring 105 can achieve a double sealing structure, whereby securing a high level of sealability.

(4) When pressure in the link chamber 114 increases, the spring 152 having a cross-sectional bent shape (cross-sectional V-formed shape) is transformed in an opening direction. That is, the bent-shaped spring 152 is transformed in the direction that the inner lip portion 151a of the seal body 151 is pressed against the outer circumferential surface of the drive shaft 128 and in the direction that the outer lip portion 151c of the seal body 151 is pressed against the inner circumferential surface of the bush 104 (inner circumferential surface of the recessed portion 141). Moreover, the pressing forces of these lip portion 151a and 151c are increased in proportion to the pressure in the link chamber 114 (in the turbine housing 111). Accordingly, even when the pressure in the link chamber 114 increases, a high level of sealability that is strong enough to withhold the pressure can be ensured. Similarly, the end portion 151e of the seal body 151 is pressed against the side surface 127a of the drive link 127 in proportion to the pressure in the link chamber 114, so that this facilitates the high level of sealability.

Thus, the spring seal 105 is provided at the end portion on the open-air side of the bush 104, which provides excellent sealability and securely prevents the exhaust gas in the link chamber 114 (in the turbine housing 111) from passing through between the outer circumferential surface of the drive shaft 128 and the inner circumferential surface of the bush 104 and flowing out to the outside. Also, even when the rust formed in the center housing 113 progresses and is stripped off, this prevents the stripped rust from getting into the clearance between the drive shaft 128 and the bush 104 or between the end surface 104a of the bush 104 (side surface of on the internal side of the link chamber 114) and the side surface 124a of the drive arm 124.

Further, this securely prevents the unburned HC from getting into the clearance between the outer circumferential surface of the drive shaft 128 and the inner circumferential surface of the bush 104. Accordingly, this solves the problem in that the unburned HC gets in the clearance between the drive shaft 128 and the bush 104, that is, the problem in that the unburned HC is attached to the outer circumferential surface of the drive shaft 128, the inner circumferential surface of the bush 104, the side surface 127a of the drive link 127, and the like, which causes degeneration (caulking) and generates deposit accumulation.

A leak of exhaust gas to the outside is inspected on experiment and the like by means of a real apparatus of the turbocharger 100 in which the sealing structure shown in FIG. 7 is applied. When pressure in the turbine housing 111 (pressure in the link chamber 114) increases to a high value (for example, 300 kPa), there has been detected no leak of the exhaust gas from the penetration portion (between the drive shaft 128 and the bush 104) of the drive shaft 128 to the outside, which verifies that the outflow of the exhaust gas is completely prevented.

Figure 10:
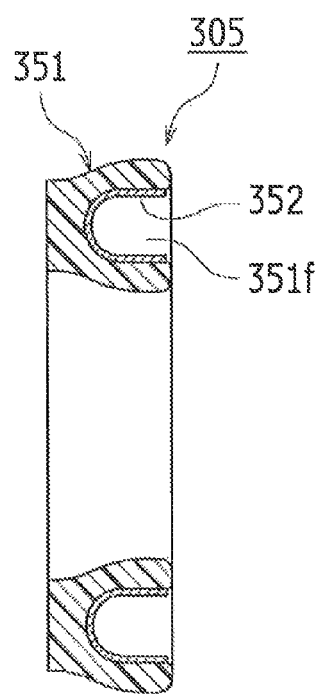
FIG. 10 is a longitudinal cross-sectional view of a spring seal illustrated as another example.

With respect to the spring seal 105 shown in FIGS. 8 and 9, the spring 152 whose cross section is V-shaped is applied. However, as shown in FIG. 10, a spring seal 305 may be used that includes a spring 352 whose cross section along a plane passing through the center of the drive shaft 128 (axis of the seal body 351) is U-shaped, wherein the spring 352 is fitted into a recessed portion 351f of the seal body 351. Also, a spring seal may be used that has a structure in which the springs 152 and 352 are embedded into the seal bodies 151 and 351.

Also, in the structure shown in FIG. 7, the spring seal 105 is fitted into the recessed portion 141 of the end portion of the bush 104 at a position that the recessed portion 151f of the seal body 151 faces the side of the link chamber 114. However, the direction of the spring seal 105 may be opposite (position that the recessed portion 151f faces the side of the drive link 128 (open-air side)).

—Waistgate Valve Apparatus—

Next, a wastegate valve apparatus 200 will be described referring to FIGS. 11 to 15.

The wastegate valve apparatus 200 of this example includes a wastegate valve 201, a link mechanism 202, a WGS actuator 204, and the like.

First, part of the configuration of the turbine housing 111 will be described prior to the wastegate valve apparatus 200. As shown in FIGS. 1 and 11 to 13, in the turbine housing 111, there is formed the exhaust bypass path 115 to bypass the turbine wheel 101. The exhaust bypass path 115 includes a circular wastegate hole 115a to penetrate a wall body 111b of the turbine housing 111 and communicates with the upstream side of the turbine wheel 101 (upstream side of exhaust gas flow) and with an exhaust gas exit path 111e. A valve seat 116 is provided at a periphery edge portion (periphery edge portion on the side of the exhaust gas exit path 111e) of the wastegate hole 115a.

The wastegate valve 201 includes a circular valve body 211 that is seated on or separated from the valve seat 116 provided in the turbine housing 111 so as to open and close the exhaust bypass path 115, and a drive arm 212 that transfers the valve body 211 in the open and close direction (direction that the valve body 211 contacts with and separates from the valve seat 116). The rocking of the drive arm 212 allows the valve body 211 to transfer between a position to close the exhaust bypass path 115 (a fully closed position: FIG. 11) and a position to fully open the exhaust bypass path 115 (a fully opened position: FIG. 12). It is noted that the valve seat 116 of the turbine housing 111 is included in the constitutional members of the wastegate valve 201.

The drive arm 212 of the wastegate valve 201 is integrally attached to the one end portion of the drive shaft 221 (end portion of the internal side of the turbine housing 111). The drive link 222 is integrally attached to the other end portion of the drive shaft 221 (end portion of the external side). The drive shaft 221 is rotatably supported by a bush 203.

Figure 15:
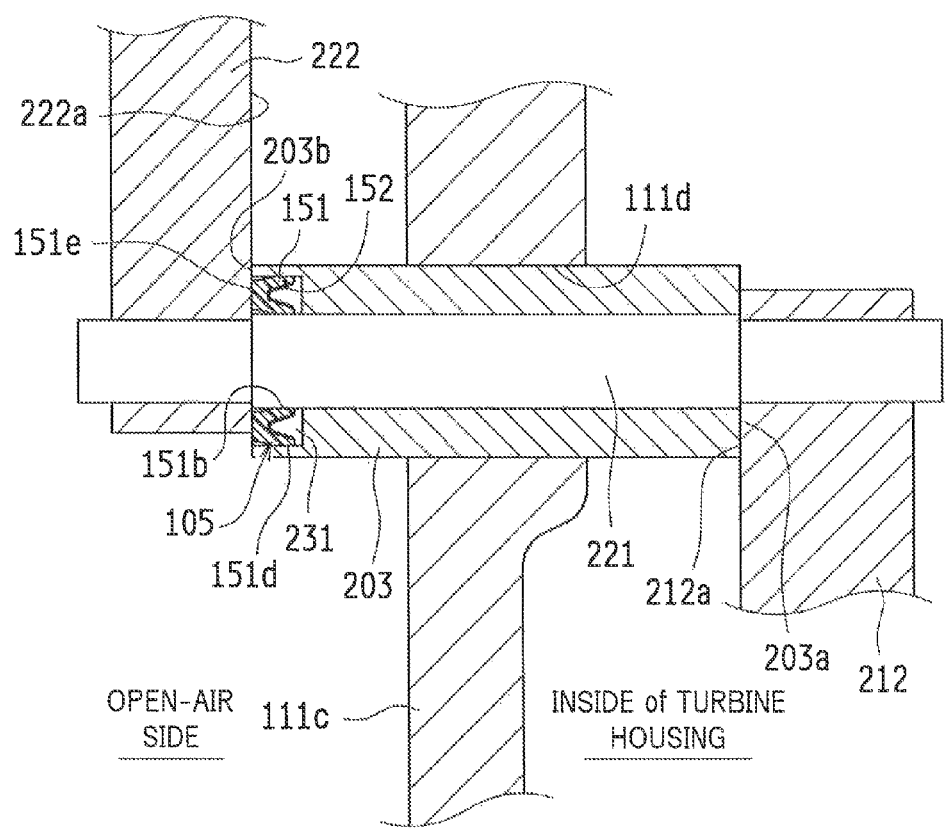
FIG. 15 is an enlarged cross-sectional view of a main part shown in FIG. 13.

The bush 203 is a cylindrical member and pressed into a bush supporting hole 111d disposed in the wall body 111c of the turbine housing 111 (see FIG. 15). The bush 203 and the drive shaft 221 penetrate through the wall body of the turbine housing 111 and are disposed respectively facing the inside and outside (atmosphere side) of the turbine housing 111.

Then, the one end portion of a link rod 223 is rotatably linked with the other end portion of the drive link 222 via a connection pin 224. The link rod 223 is linked with the WGV actuator 204. The WGV actuator 204 allows the link rod 223 to transfer (advance forward and backward) so as to rotate the drive link 222 and the drive shaft 221, and to rock the drive arm 212. The rocking of the drive arm 212 allows the valve body 211 to transfer between the fully closed position (FIG. 11) and the fully opened position (FIG. 12). Accordingly, the wastegate valve 201 is opened and closed. It is noted that the WGV actuator 204 may be applied as a negative pressure actuator that operates on negative pressure supplied from a negative pressure supply as a power source or as a positive pressure actuator. Also, the WGV actuator 204 may be applied as an electric-powered actuator whose power source is an electric motor.

In the supporting structure shown in FIG. 15, there is provided a clearance between the outer circumferential surface of the drive shaft 221 and the inner circumferential surface of the bush 203 in order to make the drive shaft 221 rotatable. Also, a distance between the side surface 212a of the drive arm 212 (surface on the side of the bush 203) and the side surface 222a of the drive link 222 (surface on the side of the bush 203) is set longer than a length of the axial direction of the bush 203 (distance between both end surfaces 203a and 203b of the bush 203) only by a predetermined length. There exists a clearance between the side surface 212a of the drive arm 212 and the end surface 203a of the bush 203 (end surface of the internal side of the turbine housing 111) or/and between the side surface 222a of the drive link 222 and the end surface 203b of the bush 203 (end surface of the open-air side).

Thus, in the supporting structure shown in FIG. 15, there exists the clearance in the penetration region of the drive shaft 221. As is the case with the supporting structure shown in FIG. 7, there is an apprehension in that the exhaust gas in the turbine housing 111 passes through between the drive shaft 221 and the bush 203 and flows out to the outside. Also, when the rust formed in the turbine housing 111 or the like progresses and is stripped off, there is the case where the stripped rust gets in a clearance between the outer circumferential surface of the drive shaft 221 and the inner circumferential surface of the bush 203, or between the end surface 203a (end surface of the internal side of the turbine housing 111) of the bush 203 and the side surface 212a of the drive arm 212, so that the motion of the wastegate valve 201 is aggravated.

In order to solve this problem, in this example as shown in FIG. 15, a spring seal 105 is provided at the end portion of the open-air side of the bush 203 (end portion of the external side of the turbine housing 111). The spring seal 105 is fitted into a circular recessed portion 231 disposed at the end portion of the external side of the bush 203. The spring seal 105 has the same structure as that shown in FIGS. 8 and 9. Accordingly, the spring seal 105 having the structure shown in FIG. 15 securely prevents the exhaust gas in the turbine housing 111 from passing through between the outer circumferential surface of the drive shaft 221 and the inner circumferential surface of the bush 203 and flowing out to the outside. Also, even when the rust formed in the turbine housing 111 and the like, progresses and is stripped off, this prevents stripped rust from getting into the clearance between the drive shaft 221 and the bush 203 or between the end surface 203a of the bush 203 (end surface of the internal side of the turbine housing 111) and the side surface 212a of the drive arm 212. Further, there occurs no problem of deposit accumulation that is caused by the attachment and degeneration (caulking) of the unburned HC described above.

Other Embodiments

The above example describes a case where the present invention is applied to a turbocharger that includes a variable nozzle vane mechanism and a wastegate valve. The present invention is not limited to this example but is applied to other turbocharger that includes any one of the variable nozzle vane mechanism and the wastegate valve.

The above example describes a case where the present invention is applied to a common rail in-cylinder direct injection multi-cylinder (inline four-cylinder) diesel engine. The present invention is not limited to this example and is applied to other diesel engines with any number of cylinders, for example, a 6-cylinder diesel engine.

The above example describes a case where the present invention is applied to control of the diesel engine. The present invention is not limited to this example but is applied to control of a gasoline engine including a turbocharger.

INDUSTRIAL APPLICABILITY

The present invention finds applications in a turbocharger mounted in an engine (internal combustion engine). More particularly, the present invention is effectively used to seal a penetration portion of a drive shaft of a turbocharger that includes the drive shaft configured to transmit a driving force of an actuator disposed on the external portion of a turbo housing to a mechanism of the inside of the turbo housing, and a bush configured to rotatably support the drive shaft.

DESCRIPTION OF THE REFERENCE NUMERAL

1 Engine
4 Intake path
5 Exhaust path
100 Turbocharger
101 Turbine wheel
102 Compressor impeller
111 Turbine housing (Turbo housing)
112 Compressor housing (Turbo housing)
113 Center housing (Turbo housing)
114 Link chamber
115 Exhaust bypass path
115a Wastegate hole
120 Variable nozzle vane mechanism
124 Drive arm
127 Drive link
128 Drive shaft
129 Link rod
104 Bush
141 Recessed portion
105 Spring seal
151 Seal body
151a Inner lip portion
151b Inner circumferential surface
151c Outer lip portion
151d Outer circumferential surface
151e End surface
151f Recessed portion
152 Spring
106 VN actuator
200 Wastegate valve apparatus
201 Wastegate valve
212 Drive arm
202 Link mechanism
221 Drive shaft
222 Drive link
223 Link rod
224 Connection pin
203 Bush
231 Recessed portion
204 WGV actuator

The invention claimed is:
1. A turbocharger comprising:
a compressor impeller configured to be provided in an intake path of an internal combustion engine;
a turbine wheel configured to be provided in an exhaust path of the internal combustion engine;

a drive shaft configured to penetrate a turbo housing to be provided and transmit a driving force of an actuator disposed at an outside of the turbo housing to a drive mechanism in the turbo housing;

a bush configured to rotatably support the drive shaft on the turbo housing; and a seal configured to be provided at an end portion on an external side of the turbo housing of the bush, the seal comprising:

a circular seal body that is made of resin and configured to include an inner circumferential surface that comes in contact with an outer circumferential surface of the drive shaft, and an end surface that is contactable with a member provided on the external side of the turbo housing of the drive shaft; and a metallic spring, wherein the seal body comprises a circular recessed portion along a circumferential direction, and an inner lip portion and an outer lip portion that are respectively configured to be provided on an inner circumferential side and an outer circumferential side of the recessed portion, and wherein the spring is fitted into the circular recessed portion of the seal body, and the inner lip portion of the seal body is pressed by an elastic force of the spring to the outer circumferential surface of the drive shaft, and the outer lip portion of the seal body is pressed by the elastic force to the inner circumferential surface of the bush.

2. The turbocharger according to claim 1, wherein the seal is disposed such that an opening of the recessed portion of the seal body faces an internal side of the turbo housing, and the spring is formed such that a cross-sectional shape along a plane passing through a center of the drive shaft is a bent shape that is opened to the internal side of the turbo housing.

3. The turbocharger according to claim 2, wherein the cross-sectional shape of the spring is formed in a V shape or a U shape.

4. The turbocharger according to claim 1, further comprising:

a plurality of nozzle vanes provided on an outer circumferential side of the turbine wheel; and a variable nozzle vane mechanism configured to adjust a flow of exhaust gas by changing an opening degree of the plurality of nozzle vanes, wherein the drive shaft is configured to link a drive arm of the variable nozzle vane mechanism in the turbo housing with a drive link on the outside of the turbo housing.

5. The turbocharger according to claim 2, further comprising:

a plurality of nozzle vanes provided on an outer circumferential side of the turbine wheel; and a variable nozzle vane mechanism configured to adjust a flow of exhaust gas by changing an opening degree of the plurality of nozzle vanes, wherein the drive shaft is configured to link a drive arm of the variable nozzle vane mechanism in the turbo housing with a drive link on the outside of the turbo housing.

6. The turbocharger according to claim 3, further comprising:

a plurality of nozzle vanes provided on an outer circumferential side of the turbine wheel; and a variable nozzle vane mechanism configured to adjust a flow of exhaust gas by changing an opening degree of the plurality of nozzle vanes, wherein the drive shaft is configured to link a drive arm of the variable nozzle vane mechanism in the turbo housing with a drive link on the outside of the turbo housing.

* * * * *